United States Patent
Low et al.

(10) Patent No.: US 12,301,516 B2
(45) Date of Patent: May 13, 2025

(54) DATA PLANE SCALABLE ARCHITECTURE FOR WIRELESS COMMUNICATION

(71) Applicant: GREATER SHINE LIMITED, New Taipei (TW)

(72) Inventors: Su-Lin Low, San Diego, CA (US); Tianan Ma, San Diego, CA (US); Hong Kui Yang, San Diego, CA (US); Chun-l Lee, San Diego, CA (US); Hausting Hong, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 458 days.

(21) Appl. No.: 17/944,334

(22) Filed: Sep. 14, 2022

(65) Prior Publication Data

US 2023/0019102 A1 Jan. 19, 2023

Related U.S. Application Data

(63) Continuation of application No. PCT/US2021/024007, filed on Mar. 24, 2021.
(Continued)

(51) Int. Cl.
  *H04L 5/00*  (2006.01)
  *H04W 72/1263*  (2023.01)

(52) U.S. Cl.
  CPC ....... *H04L 5/0098* (2013.01); *H04W 72/1263* (2013.01)

(58) Field of Classification Search
  None
  See application file for complete search history.

(56) References Cited

U.S. PATENT DOCUMENTS

| 5,299,226 A | 3/1994 | Schilling |
| 5,892,913 A | 4/1999 | Adiga et al. |

(Continued)

FOREIGN PATENT DOCUMENTS

| CN | 101808069 A | 8/2010 |
| CN | 102067504 A | 5/2011 |

(Continued)

OTHER PUBLICATIONS

First Office Action issued in corresponding Chinese application No. 202180026775.4, mailed May 26, 2023.
(Continued)

*Primary Examiner* — Minh Trang T Nguyen
(74) *Attorney, Agent, or Firm* — BAYES PLLC

(57) ABSTRACT

Embodiments of apparatus and method for data plane management are disclosed. In one example, an apparatus for communication both uplink and downlink can include a plurality of downlink clusters, each downlink cluster including a downlink cluster processor configured to process three or more downlink data layers. The apparatus can also include a plurality of uplink clusters, each uplink cluster including an uplink cluster processor configured to process three or more uplink data layers. The apparatus can further include a controller configured to scale the plurality of downlink clusters and configured to scale the plurality of uplink clusters. Scaling the plurality of downlink clusters and the plurality of uplink clusters can include activating or deactivating one or more clusters of the plurality of downlink clusters, the plurality of uplink clusters, or both the plurality of downlink clusters and the plurality of uplink clusters.

20 Claims, 10 Drawing Sheets

Related U.S. Application Data

(60) Provisional application No. 63/013,368, filed on Apr. 21, 2020.

(56) References Cited

U.S. PATENT DOCUMENTS

| | | | |
|---|---|---|---|
| 10,394,611 B2* | 8/2019 | Mallipeddi | G06F 9/5061 |
| 10,735,521 B1 | 8/2020 | Woodhead et al. | |
| 2010/0067435 A1 | 3/2010 | Balachandran et al. | |
| 2012/0028636 A1 | 2/2012 | Khawer et al. | |
| 2012/0322453 A1 | 12/2012 | Weng et al. | |
| 2013/0054776 A1 | 2/2013 | Kunze | |
| 2013/0107694 A1 | 5/2013 | Hu et al. | |
| 2014/0149590 A1 | 5/2014 | Mallipeddi et al. | |
| 2015/0063502 A1 | 3/2015 | Nammi et al. | |
| 2015/0085680 A1* | 3/2015 | Vrzic | H04W 84/045 370/252 |
| 2015/0327076 A1 | 11/2015 | Cui et al. | |
| 2019/0268116 A1 | 8/2019 | Nasiri Khormuji | |

FOREIGN PATENT DOCUMENTS

| | | |
|---|---|---|
| CN | 103947233 A | 7/2014 |
| CN | 104812098 A | 7/2015 |
| CN | 104902444 A | 9/2015 |
| CN | 105229934 A | 1/2016 |
| CN | 105703715 A | 6/2016 |
| CN | 107231421 A | 10/2017 |
| CN | 109075994 A | 12/2018 |
| CN | 109792364 A | 5/2019 |
| CN | 110192423 A | 8/2019 |
| CN | 110662181 A | 1/2020 |
| CN | 110971646 A | 4/2020 |
| WO | 0246888 A2 | 6/2002 |

OTHER PUBLICATIONS

Extended European Search Report issued in corresponding European application No. 21731375.8, mailed Jul. 10, 2023.

Notice of Allowance issued in corresponding Chinese application No. 202180026775.4, mailed Aug. 21, 2023.

Kin-Yip Liu, "High performance and efficient single-chip small cell base station SoC", Hot Chips 24, Aug. 2012.

Title: Research and Implementation of Portal System Based on Openstack Cloud Computing Platform; Author: Zhang Zhihao; Release Date: Mar. 15, 2018; Publisher: China Master's Theses Full-text Database.

International Search Report issued in International application No. PCT/US2021/024007, mailed Jul. 12, 2021.

Written Opinion of the International Searching Authority issued in International application No. PCT/US2021/024007, mailed Jul. 12, 2021.

Yuanjie Li et al., "A Control-Plane Perspective on Reducing Data Access Latency in LTE Networks", MobiCom'17, Oct. 16-20, 2017, Snowbird, UT, USA.

* cited by examiner

DATA PLANE SCALABLE ARCHITECTURE FOR WIRELESS COMMUNICATION

CROSS-REFERENCE TO RELATED APPLICATIONS

This application is a continuation of International Application No. PCT/US2021/024007, filed Mar. 24, 2021, which claims the benefit of priority to U.S. Provisional Application No. 63/013,368, filed Apr. 21, 2020, entitled "ADAPTABLE 5G DATA PLANE SCALABLE ARCHITECTURE for HIGH THROUGHPUT AND LOW LATENCY DATA TRANSFER," both of which are hereby incorporated by reference in their entireties.

BACKGROUND

Embodiments of the present disclosure relate to apparatuses and methods for wireless communication.

Wireless communication systems are widely deployed to provide various telecommunication services such as telephony, video, data, messaging, and broadcasts. In wireless communications, there may be uplink communications from a user equipment to a base station and downlink communications from the base station to the user equipment.

SUMMARY

Embodiments of apparatus and method for uplink data plane management are disclosed herein.

In one example, an apparatus for communication both uplink and downlink can include a plurality of downlink clusters, each downlink cluster including a downlink cluster processor configured to process three or more downlink data layers. The apparatus can also include a plurality of uplink clusters, each uplink cluster including an uplink cluster processor configured to process three or more uplink data layers. The apparatus can further include a controller configured to scale the plurality of downlink clusters and configured to scale the plurality of uplink clusters. Scaling the plurality of downlink clusters and the plurality of uplink clusters can include activating or deactivating one or more clusters of the plurality of downlink clusters, the plurality of uplink clusters, or both the plurality of downlink clusters and the plurality of uplink clusters.

In another example, a method for cluster management can include activating a first downlink cluster of a plurality of downlink clusters, each downlink cluster including a downlink cluster processor configured to process three or more downlink data layers. The method can also include activating a first uplink cluster of a plurality of uplink clusters, each uplink cluster including an uplink cluster processor configured to process three or more uplink data layers. The method can further include activating at least one more cluster of the plurality of downlink clusters or the plurality of uplink clusters, based on a first scaling condition being met.

In a further example, a non-transitory computer-readable medium can be encoded with instructions that, when executed in hardware, perform a process for cluster management. The process can include activating a first downlink cluster of a plurality of downlink clusters, each downlink cluster including a downlink cluster processor configured to process three or more downlink data layers. The process can also include activating a first uplink cluster of a plurality of uplink clusters, each uplink cluster including an uplink cluster processor configured to process three or more uplink data layers. The process can further include activating at least one more cluster of the plurality of downlink clusters or the plurality of uplink clusters, based on a first scaling condition being met.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
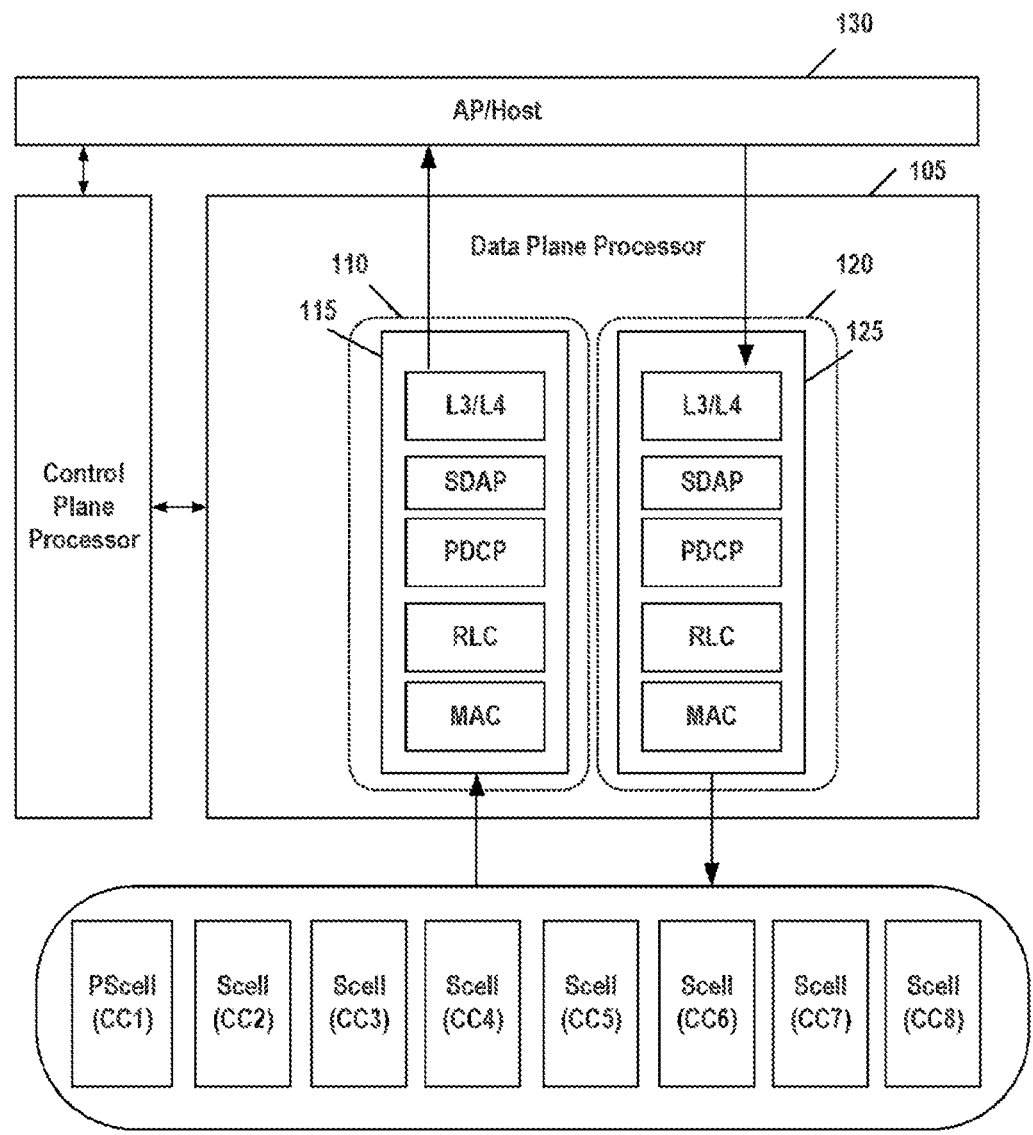
FIG. 1 illustrates a fifth-generation (5G) data plane architecture.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), CDMA 2000, etc. A TDMA network may implement a RAT, such as Global System for Mobile communication (GSM). An OFDMA network may implement a RAT, such as Long-Term Evolution (LTE) or New Radio (NR). The techniques described herein may be used for the wireless networks and RATs mentioned above, as well as other wireless networks and RATs.

In typical cellular modems, the data plane architecture of the modem may be statically configured for the maximum expected throughput processing, including processors that are not scalable. In some cellular modems, processing units that are specific to one or two layers may be implemented. As such, the processing units may not be proportionally scalable to optimize the power and performance of the modem, to support either high throughput or low latency low throughput applications.

FIG. 1 illustrates a 5G data plane architecture. As shown in FIG. 1, in a 5G cellular wireless modem, the UE data stack can include layer two (L2) layers of medium access control (MAC), radio link control (RLC), packet data convergence protocol (PDCP), and service data adaptation protocol (SDAP), and L3/L4 layers. The UE data stack can process the internet protocol (IP) layer functions.

FIG. 1 illustrates a typical structure of data stack processing architecture for a 5G cellular wireless modem. Separate vertical processing stacks, a downlink (DL) processing engine 110 and an uplink (UL) processing engine 120, are usually put together in one processing engine, in this example data plane processor 105, for the DL data stack and UL data stack, which could be one processor core or separate cores for each layer. In FIG. 1, a single DL core 115 and a single UL core 125 are illustrated by way of example.

Within the protocol stacks (whether considering the DL data stack or the UL data stack), the MAC layer can interface with the physical (PHY) layer to transfer DL and UL data, and the L3/L4 layer can interface with the AP/Host 130. Packet data can be transferred from shared memory (not shown) throughout the data stack, which could be local or external memory.

In a typical 5G carrier aggregation (CA) configuration, multiple Component Carriers (CCs) can be aggregated for a MAC entity, which presents challenging processing requirements for the data stack to process multiple Transport Blocks (TBs), one from each CC, in one time slot. This is processed for time slot durations from 1 ms (which implies 15 kHz subcarrier spacing (SCS)), 0.5 ms (which implies 30 kHz SCS), 0.25 ms (which implies 60 kHz SCS), and up to 0.125 ms (which implies 120 kHz SCS).

At the DL, the MAC layer can decode and route TBs from each CC to logical channels up the data stack processing chain. The DL data stack can include packet processing and radio link recovery mechanisms at RLC, PDCP, SDAP, and L3/L4 layers.

At the UL, arriving data packets from AP/Host 130 can be processed by L3/L4, PDCP, RLC layers and put into LC queues. Upon grant arrival from each CC, the MAC layer can multiplex the data to be sent out for each TB on each CC.

As shown in FIG. 1, there can be multiple CCs. For example, one component carrier (in this example, CC1) can be for a primary cell of a secondary cell group (SCG) (PScell). The remaining component carriers may be for other cells of the SCG. It may be valuable for the data stack to process multiple TBs from multiple CC efficiently and effectively for all traffic loads.

A challenge in 5G data plane architecture is to provide an efficient system that is able to scale with a full spectrum of processing needs, for both DL and UL data transfer, for high throughput and low latency data. The previous approaches may provide inefficient resource usage in the UE, requiring the modem to support maximum processing traffic independent of dynamic conditions. The previous approaches may also require increased power at the UE, even at low data rates. The previous approaches may also have an inherent inability to expand the architecture to support additional throughput increases or additional multiple carriers support. Furthermore, previous approaches may rely on complex implementation schemes to modify architecture for any layer processing. Additionally, previous approaches may have an inflexible design to support both high throughput and low latency applications.

By contrast, some embodiments of the present disclosure provide a 5G data plane architecture and control mechanism that can be dynamically scaled for high throughput and low latency data transfers. Some embodiments may provide self-contained data plane cluster processing units for the DL and UL data stacks, which can be adaptively scaled up or down depending on dynamic traffic and loading conditions, hence optimizing the processing resource usage in the modem.

Figure 2:
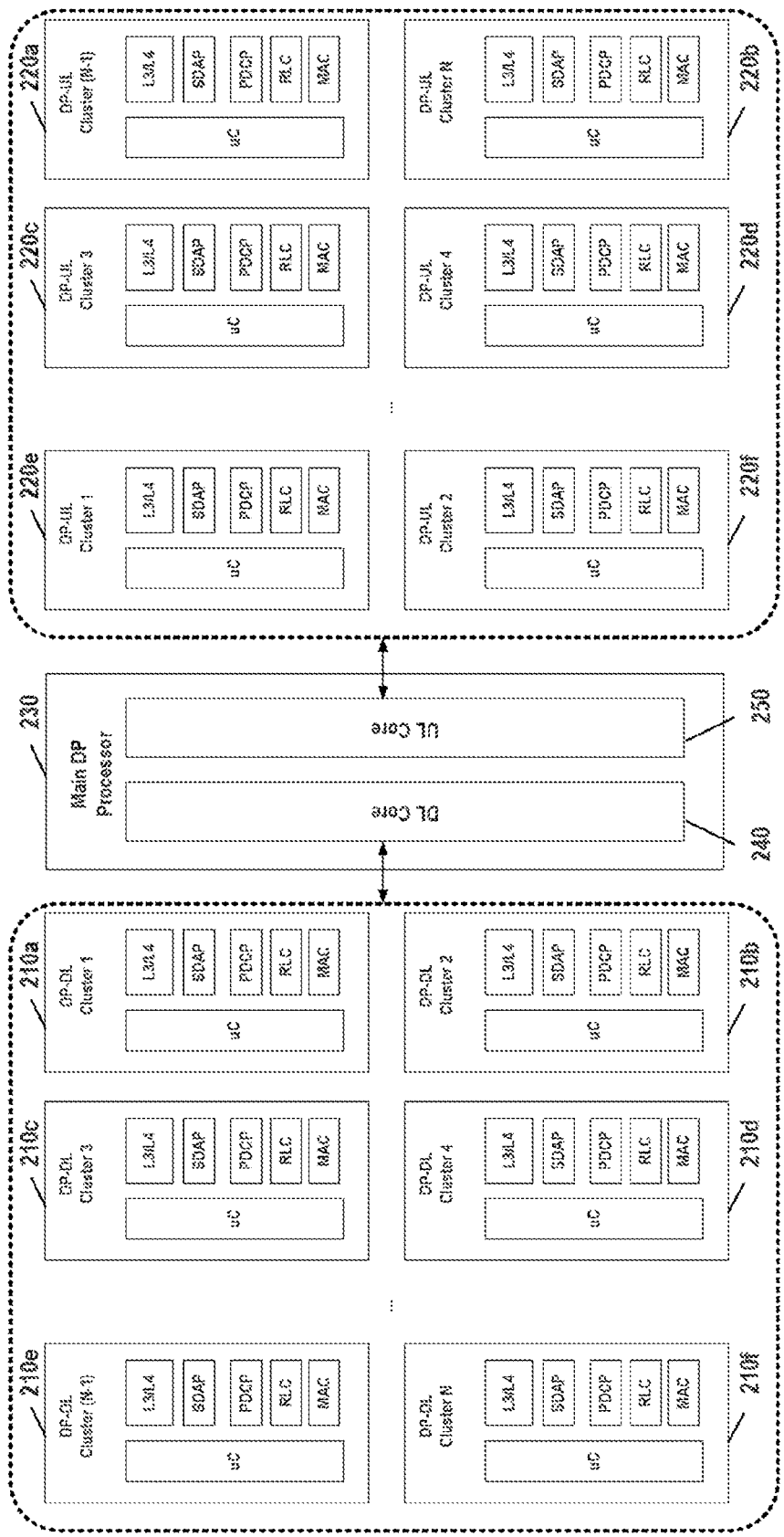
FIG. 2 illustrates an adaptable and scalable data plane architecture, according to some embodiments of the present disclosure.

FIG. 2 illustrates an adaptable and scalable data plane architecture, according to some embodiments of the present disclosure. More particularly, some embodiments may provide a 5G data plane architecture that may be dynamically scalable for high throughput and low latency data transfers.

In some embodiments, there can be multiple DL clusters, DL clusters 210*a*, 210*b*, 210*c*, 210*d*, 210*e*, and 210*f*; and each DL cluster can include a full data stack. More particularly, a DL cluster unit can include all the L2, L3 & L4 data layers, and can be mapped to a set of component carriers at the MAC layer and logical channels from L2 upwards.

Similarly, in some embodiments, there can be multiple UL clusters, UL clusters 220a, 220b, 220c, 220d, 220e, and 220f, and each UL cluster can include a full data stack. More particularly, a UL cluster unit can include all the L2, L3 & L4 data layers, and can be mapped to a set of component carriers according to the same subcarrier spacing (SCS) range.

Some embodiments of the present disclosure permit the DL clusters to be dynamically scalable DL clusters. The dynamic scaling can be based on CPU load and throughput. For example, DL clusters can be dynamically scaled up or down once the total CPU load or throughput exceeds or falls below current total cluster thresholds.

Similarly, some embodiments of the present disclosure permit the UL clusters to be dynamically scalable UL clusters. The dynamic scaling may be based on CPU load, throughput, and latency. For example, UL clusters can be dynamically scaled up or down once the total CPU load, or throughput, or latency exceeds or fall below current total cluster thresholds.

The dynamic scaling may be controlled by a controller, such as main data plane processor 230. Main data plane processor 230 may have multiple cores including, for example, a downlink core 240 and an uplink core 250. These cores may be implemented by two or more CPU cores. The cores may be used for DL and UL overall data stack non-real-time operations and hosting of the dynamic scaling algorithms or other mechanisms.

As shown, the DL data plane scalable cluster subsystem can include one or many DL cluster units, each hosting the full data stack of MAC, RLC, PDCP, SDAP, L3, and L4 layers. Each such cluster can be self-contained, and can include a microcontroller (uC) core and data plane hardware (HW) accelerators.

As also shown, the UL data plane scalable cluster subsystem can include one or many UL cluster units, each hosting the full data stack of MAC, RLC, PDCP, SDAP, L3, and L4 layers. Each such cluster can be self-contained, and can include a microcontroller core and data plane HW accelerators.

Upon radio resource control (RRC) connection setup or reconfiguration, an initial set of DL and UL cluster units can be configured according to the maximum required traffic load. Only a minimal set of clusters may be initially activated. Other unnecessary clusters may be left powered off to achieve the lowest power required for operations.

Subsequently, as the moving average traffic load increases or if the CPU load exceeds a pre-determined threshold sustainable by each cluster unit, more clusters can be activated to redistribute the load. Each cluster periodically reports its CPU and traffic load to the data plane (DP) main processor, which monitors the overall DL and UL scalability.

Conversely, if the traffic load decreases below the overall cluster threshold, some of the clusters can be deactivated to save power. The remaining clusters can then be redistributed with the total load.

Each DL cluster can be mapped to a distributed set of CCs and logical channels (LCs), while each UL cluster can be mapped to a set of CCs corresponding to the subcarrier spacing that operates at a similar slot duration for UL grant scheduling.

Figure 3:
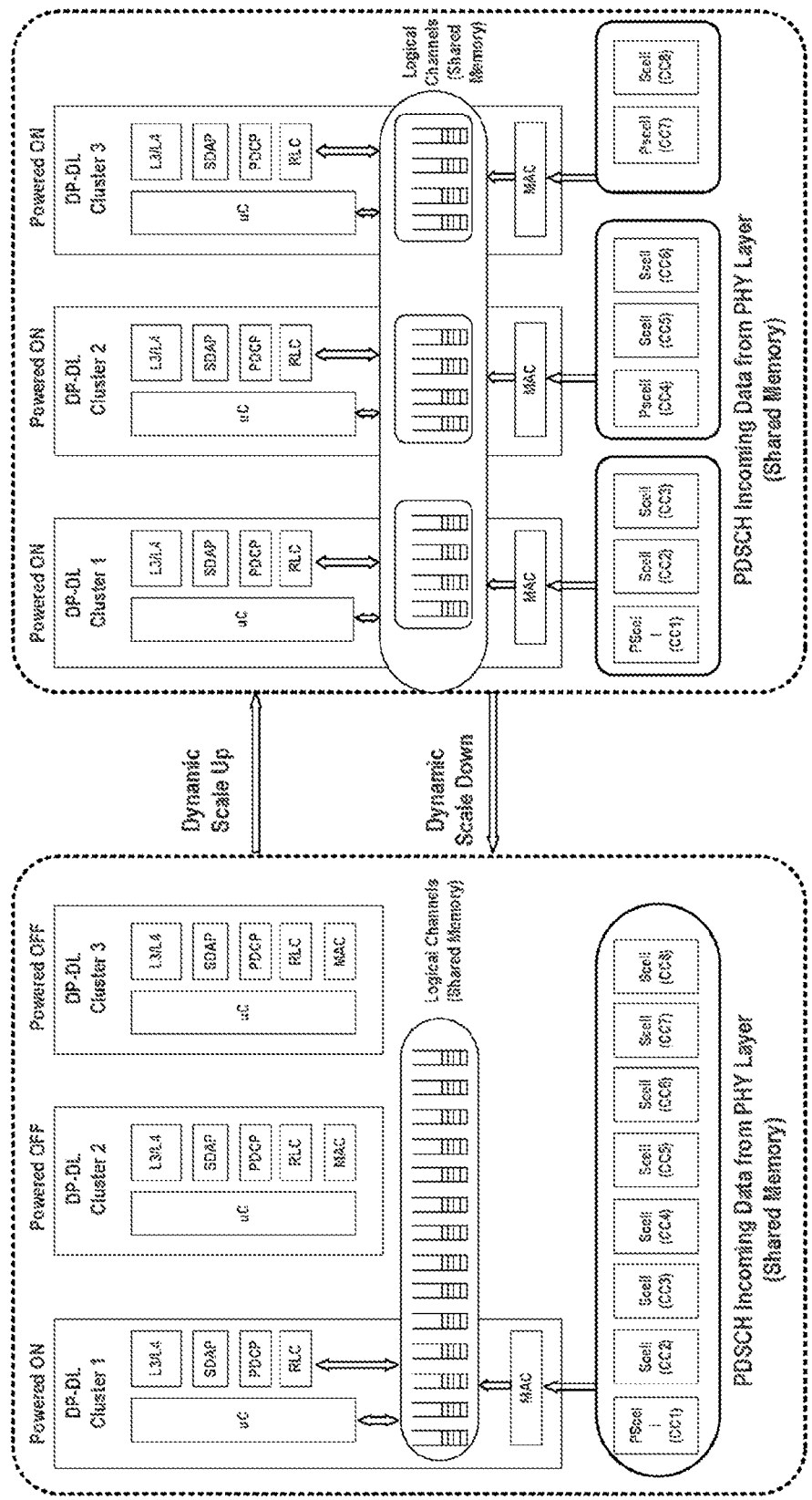
FIG. 3 illustrates downlink data plane cluster dynamic scaling, according to some embodiments of the present disclosure.
Figure 4:
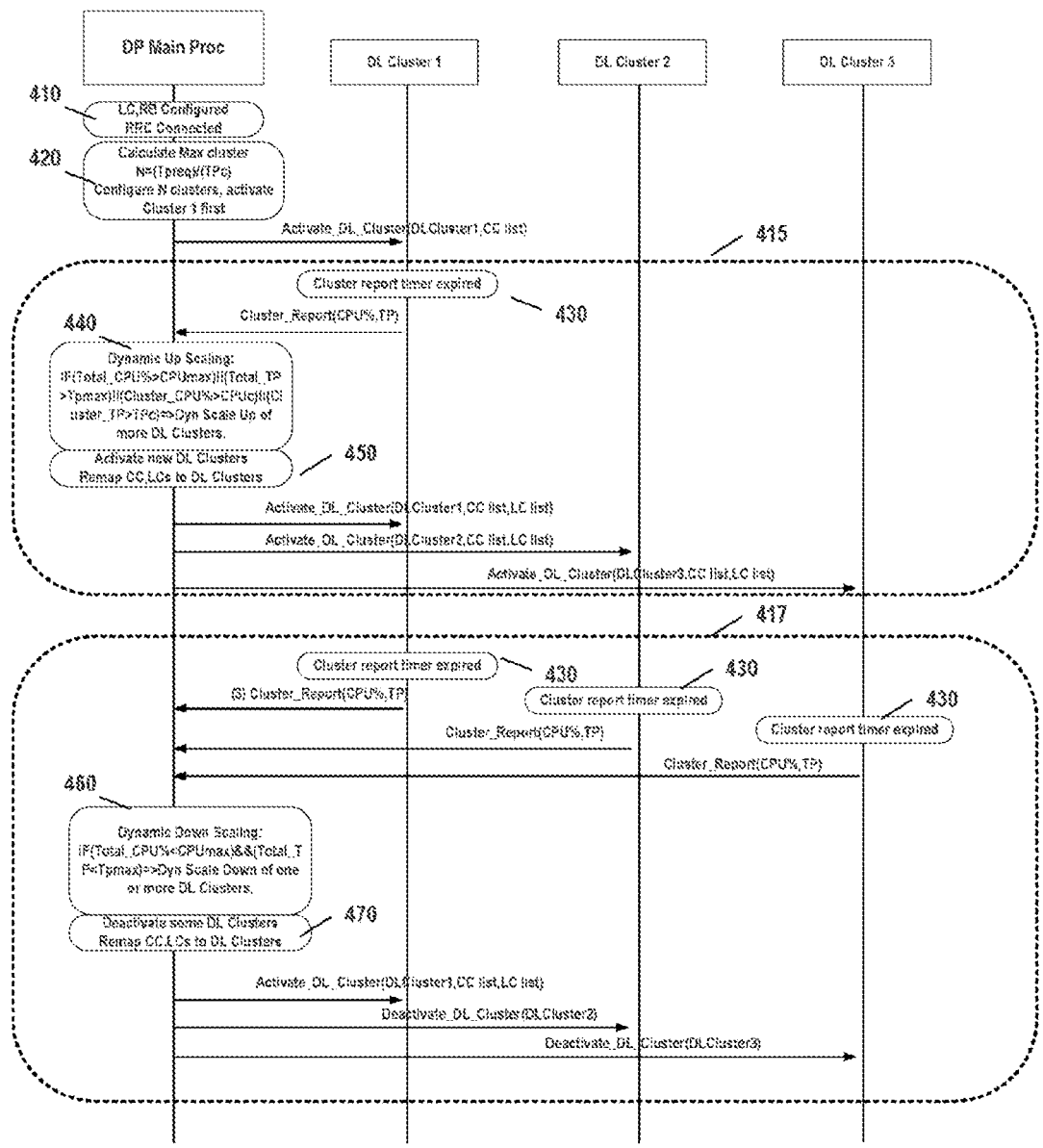
FIG. 4 illustrates a signal flow diagram for scaling of downlink clusters, according to some embodiments of the present disclosure.

FIG. 3 illustrates downlink data plane cluster dynamic scaling, according to some embodiments of the present disclosure. FIG. 4 illustrates a signal flow diagram for scaling of downlink clusters, according to some embodiments of the present disclosure. FIG. 4 can be the signal flow that corresponds to the data flow and processor activation/deactivation shown in FIG. 3.

In a first stage of a process, a controller of the data cluster can configure and activate an initial cluster.

Firstly, upon RRC setup and configuration (shown at 410 in FIG. 4), the cells, component carriers, logical channels, and radio bearers can be configured for a MAC entity. The controller can, at 420 in FIG. 4, calculate the maximum clusters N for DL data operation using N=(TPreq)/(TPc), where TPreq can be the total required throughput (TP) to be supported in the UE system and TPc can be the TP threshold maximum per cluster.

The controller can configure N maximum clusters, activate Cluster 1 first, and power off the rest. Initially, all component carriers and logical channels can be processed by Cluster 1. Note that TPc can be obtained through a microprocessor without interlocked pipelined stages (MIPS) estimation for the cluster for the entire data stack operation with the corresponding data stack hardware.

Secondly, there can be cluster reporting and triggering of DL scale up at 415. There can be a cluster report provided by each active cluster on a periodic basis, for example, using a cluster report timer as illustrated at 430 in FIG. 4. On receipt of periodic cluster reports, which can provide updates on the CPU % and TP per cluster, the DP main processor or other controllers can determine if dynamic scale-up is needed. For example, at 440, the controller may use the following: If (Total_CPU %>CPUmax) OR (Total_TP>TPmax) OR (Cluster_CPU %>CPUc) OR (Cluster_TP>TPc), then do dynamic scale-up of more DL clusters, where Total_CPU % can be the total reported CPU load from all the current activated clusters, Total_TP can be the total reported TP value from all the current activated clusters, Cluster_CPU % can be the reported CPU load from any one cluster, and Cluster_TP can be the reported TP value from any one cluster.

The above-described indicators can be processed and filtered through an averaging function at the DP main processor. Such an averaging filter can prevent instantaneous fluctuations in values at each cluster.

CPUmax can be defined as CPUmax=(n)*(CPUc). This can be the total CPU load threshold maximum for all the n activated clusters in the system. Exceeding this implies that the current activated clusters are not able to support the CPU load with performance, and more clusters need to be activated.

TPmax can be defined as TPmax=(n)*(TPc). This can be the total TP threshold maximum for all the n activated clusters in the system. Exceeding this implies that the current activated clusters are not able to support the traffic load with performance, and more clusters need to be activated.

CPUc and TPc can be defined in this way: CPUc can be CPU % load threshold maximum per cluster, and TPc can be TP threshold maximum per cluster.

In some embodiments, if the total reported CPU or TP, or individual cluster's reported CPU or TP, exceeded the threshold amount, then a dynamic scale-up of more DL clusters can be required in order to offload the CPU and/or TP traffic load.

The controller can, at 450, activate additional DL clusters as follows: determine number of active clusters n using, for example, n=max[(Total_TP)/(TPc), (Total_CPU %)/(CPUc)], then divide evenly the CC list and LC list for each DL cluster. In this case, the number of CC per cluster can be the Total CC/n, and the number of LC per cluster can be Total LC/n.

In each cluster, the incoming packets from the physical downlink shared channel (PDSCH) physical channels can be processed by the MAC DP HW, which decodes and routes the packets to the associated logical channel queue in shared memory. At the next layer, the RLC SW and HW in each cluster dequeues the mapped LC packets, and processes them further. The packets in each LC are then sent upwards in the data stack.

All the actions and decisions from 430 through 450 may be considered part of dynamic scaling up 415, in contrast to dynamic scaling down 417. While only one process of dynamic scaling up 415 and dynamic scaling down 417 are shown, the same process can be repeated up or down numerous times during the operation of the device, for example, during the operation of a user equipment or a given modem of the user equipment.

Thirdly, there can be cluster reporting and triggering of DL scale down at 417. As cluster timer reports expire at 430 for each cluster, the cluster can provide a cluster report. On receipt of periodic cluster reports, which can provide updates on the CPU % and TP per cluster, the DP main processor or other controllers can determine whether dynamic scale down is needed as follows: If (Total_CPU %<CPUmax) AND (Total_TP<TPmax), then do dynamic scale down of some DL clusters. For example, if the total reported CPU or TP, or individual cluster's reported CPU or TP, decreased beyond the threshold amount, then a dynamic scale down of some DL clusters can be done, in order to reduce the power of the modem. For example, the controller can deactivate additional DL clusters as follows: determine the number of necessary reduced active clusters n using n=max[(Total_TP)/(TPc), (Total_CPU %)/(CPUc)], then divide evenly the CC list and LC list for each DL Cluster. As in the case of DL cluster activation, in the case of DL cluster deactivation, the number of CC per cluster=Total CC/n, and the number of LC per cluster=Total LC/n.

A similar approach can be applied for uplink as for downlink. In the case of downlink above, a three cluster example is illustrated and similarly in the case of uplink below, a three-cluster example is illustrated. On the other hand, as shown in FIG. 2, more than three clusters may be used, with the three-cluster examples serving merely as illustrations.

Figure 5:
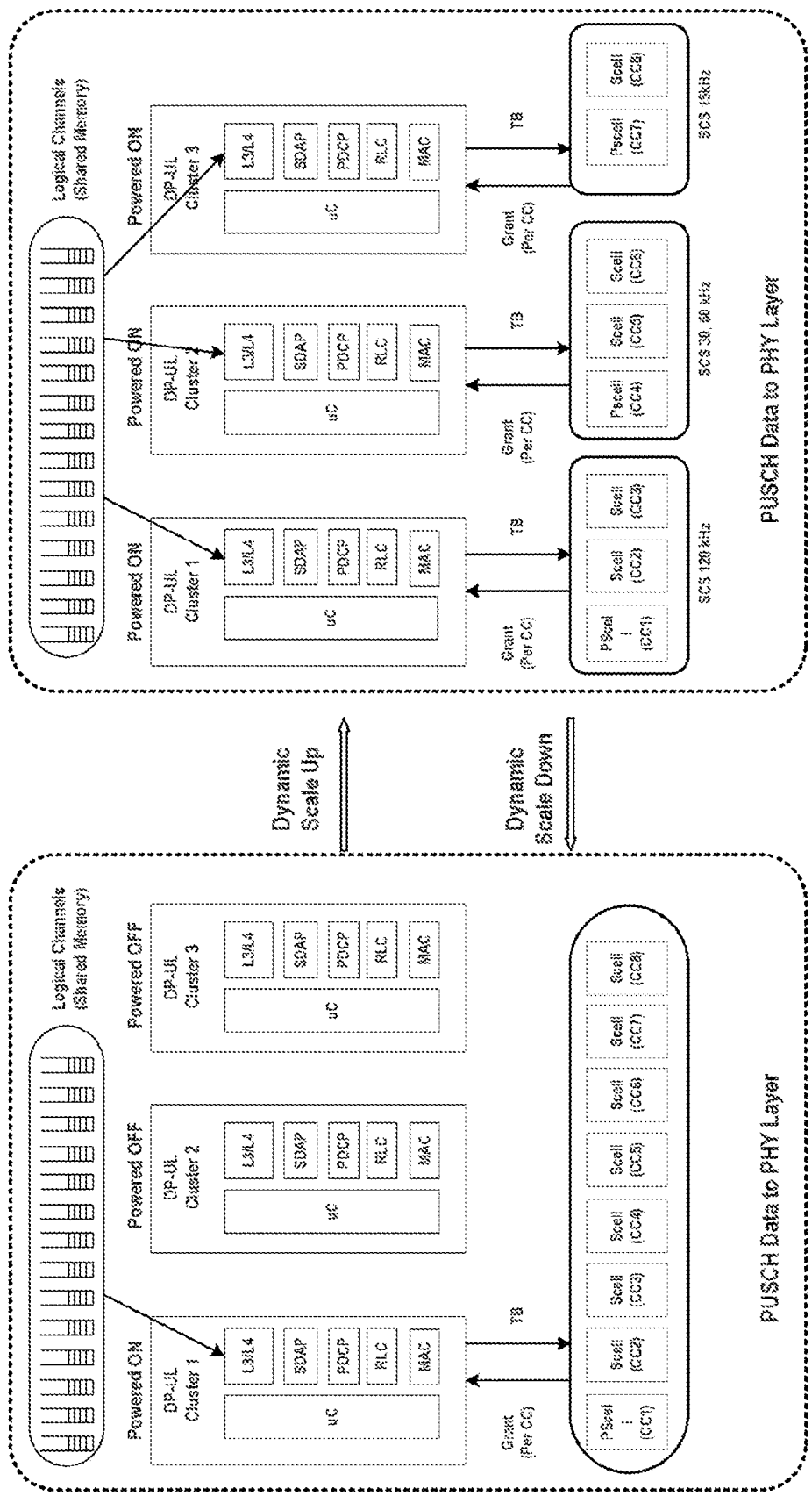
FIG. 5 illustrates uplink data plane cluster dynamic scaling, according to some embodiments of the present disclosure.
Figure 6:
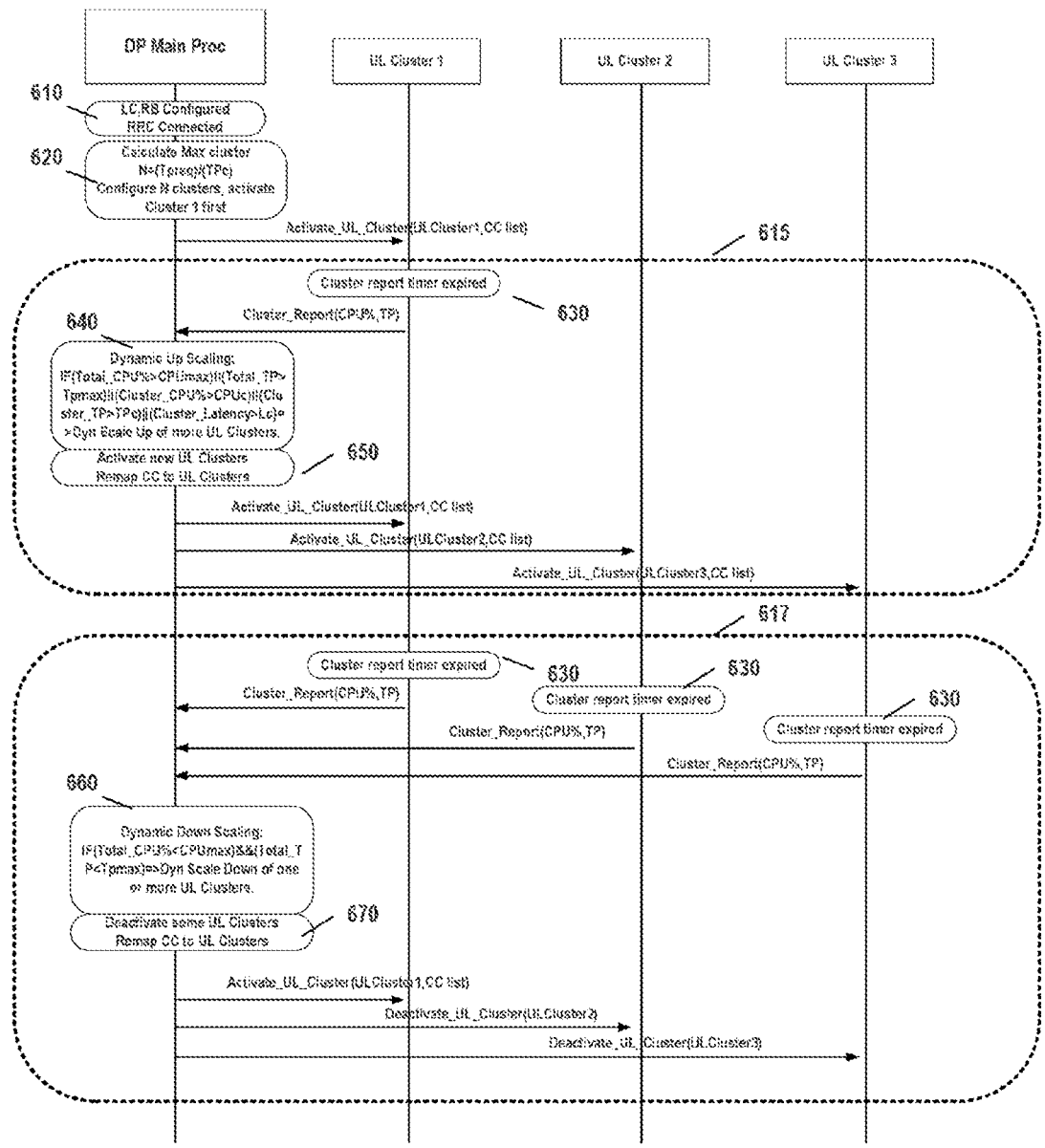
FIG. 6 illustrates a signal flow diagram for scaling of uplink clusters, according to some embodiments of the present disclosure.

FIG. 5 illustrates uplink data plane cluster dynamic scaling, according to some embodiments of the present disclosure. FIG. 6 illustrates a signal flow diagram for scaling of uplink clusters, according to some embodiments of the present disclosure. FIG. 6 can be the signal flow that corresponds to the data flow and processor activation/deactivation shown in FIG. 5.

In a first stage of a process, a controller of the data cluster can configure and activate an initial cluster.

Firstly, upon RRC setup and configuration (shown at 610 in FIG. 6), the cells, component carriers, logical channels, and radio bearers can be configured for a MAC entity. The controller can, at 620 in FIG. 6, calculate the maximum clusters N for UL data operation using N=(TPreq)/(TPc), where TPreq can be the total required throughput (TP) to be supported in the UE system and TPc can be the TP threshold maximum per cluster.

The controller can configure N maximum clusters, activate Cluster 1 first, and power off the rest. Initially, all component carriers and logical channels can be processed by Cluster 1. Note that TPc can be obtained through microprocessor without interlocked pipelined stages (MIPS) estimation for the cluster for the entire data stack operation with the corresponding data stack hardware.

Secondly, there can be cluster reporting and triggering of UL scale up at 615. There can be a cluster report provided by each active cluster on a periodic basis, for example, using a cluster report timer as illustrated at 630 in FIG. 6. On receipt of periodic cluster reports, which can provide updates on the CPU % and TP per cluster, the DP main processor or other controllers can determine if dynamic scale-up is needed. For example, at 640, the controller may use the following: If (Total_CPU %>CPUmax) OR (Total_TP>TPmax) OR (Cluster_CPU %>CPUc) OR (Cluster_TP>TPc) OR (Cluster_Latency>Lc), then do a dynamic scale-up of more UL clusters, where Total_CPU % can be the total reported CPU load from all the current activated clusters, Total_TP can be the total reported TP value from all the current activated clusters, Cluster_CPU % can be the reported CPU load from any one cluster, Cluster_TP can be the reported TP value from any one cluster, and Cluster_Latency can be the reported average latency value from any one cluster.

The above-described indicators can be processed and filtered through an averaging function at the DP main processor. Such an averaging filter can prevent instantaneous fluctuations in values at each cluster.

CPUmax can be defined as CPUmax=(n)*(CPUc). This can be the total CPU load threshold maximum for all the n activated clusters in the system. Exceeding this implies that the current activated clusters are not able to support the CPU load with performance, and more clusters need to be activated.

TPmax can be defined as TPmax=(n)*(TPc). This can be the total TP threshold maximum for all the n activated clusters in the system. Exceeding this implies that the current activated clusters are not able to support the traffic load with performance, and more clusters need to be activated.

CPUc and TPc can be defined in this way: CPUc can be CPU % load threshold maximum per cluster and TPc can be TP threshold maximum per cluster. Lc can be the latency threshold for each UL cluster.

In some embodiments, if the total reported CPU or TP, or individual cluster's reported CPU or TP, exceeded the threshold amount, then a dynamic scale-up of more UL clusters can be required in order to offload the CPU and/or TP traffic load.

The controller can, at 650, activate additional UL clusters as follows: determine number of active clusters n using, for example, n=max[(Total_TP)/(TPc), (Total_CPU %)/(CPUc)], then divide evenly the CC list for each UL cluster, but taking into account to group the CCs according to the SCS. In this case, the number of CC per cluster can be the Total CC/n.

The UL grant processing for each cluster can be dependent on the latency requirement for each CC's grant, which can be highly dependent on the SCS corresponding to the slot duration. Grouping the SCS for 120 KHz allows the Low Latency applications to be scheduled together with equal priority and processing bandwidth.

Grouping together the SCS for 30 KHz or 60 kHz may allow higher throughput applications to be scheduled more efficiently with similar timing resource allocations.

Thirdly, there can be cluster reporting and triggering of UL scale down at 617. As cluster timer reports expire at 630 for each cluster, the cluster can provide a cluster report. On receipt of periodic cluster reports, which can provide updates on the CPU % and TP per cluster, the DP main processor or other controllers can determine whether dynamic scale down is needed as follows: If (Total_CPU %<CPUmax) AND (Total_TP<TPmax), then do dynamic scale down of some UL clusters. For example, if the total reported CPU or TP, or individual cluster's reported CPU or TP, decreased beyond the threshold amount, then a dynamic scale down of some UL clusters can be done, in order to reduce the power of the modem. For example, the controller can deactivate additional UL clusters as follows: determine the number of necessary reduced active clusters n using n=max[(Total_TP)/(TPc), (Total_CPU %)/(CPUc)], then divide evenly the CC list for each UL Cluster but taking into account to group the CCs according to the SCS. As in the case of UL cluster activation, in the case of UL cluster deactivation, the number of CC per cluster=Total CC/n.

As illustrated by these examples, some embodiments of the present disclosure may allow the UE to optimize the power and performance of the modem by applying a scalable DL and UL data plane cluster architecture.

Some embodiments may provide various benefits and/or advantages. For example, some embodiments may make efficient resource usage of data plane processing HW and SW. Some embodiments may provide improved use of UE power with minimal resources needed. Furthermore, some embodiments may provide optimized data processors for both high throughput and low latency applications.

Some embodiments may provide a simple, practical implementation method for dynamic scaling. Some embodiments provide non-invasive procedures for dynamic scaling up or scaling down data processing, by redistributing processing mapping of CCs and, in some cases LCs, in shared memory. Furthermore, some embodiments provide a flexible architecture to expand support for future higher throughput requirements, and support for additional component carriers.

In the illustrated examples, the UL cluster units and DL cluster units are distinct from one another, but similar to their peer cluster units. In some embodiments, UL cluster units (and similarly DL cluster units) may be specifically created for specific application needs, and may be scalable accordingly. As another alternative, a combination of UL and DL cluster units can be created for different application needs, and may be scalable accordingly.

Figure 7:
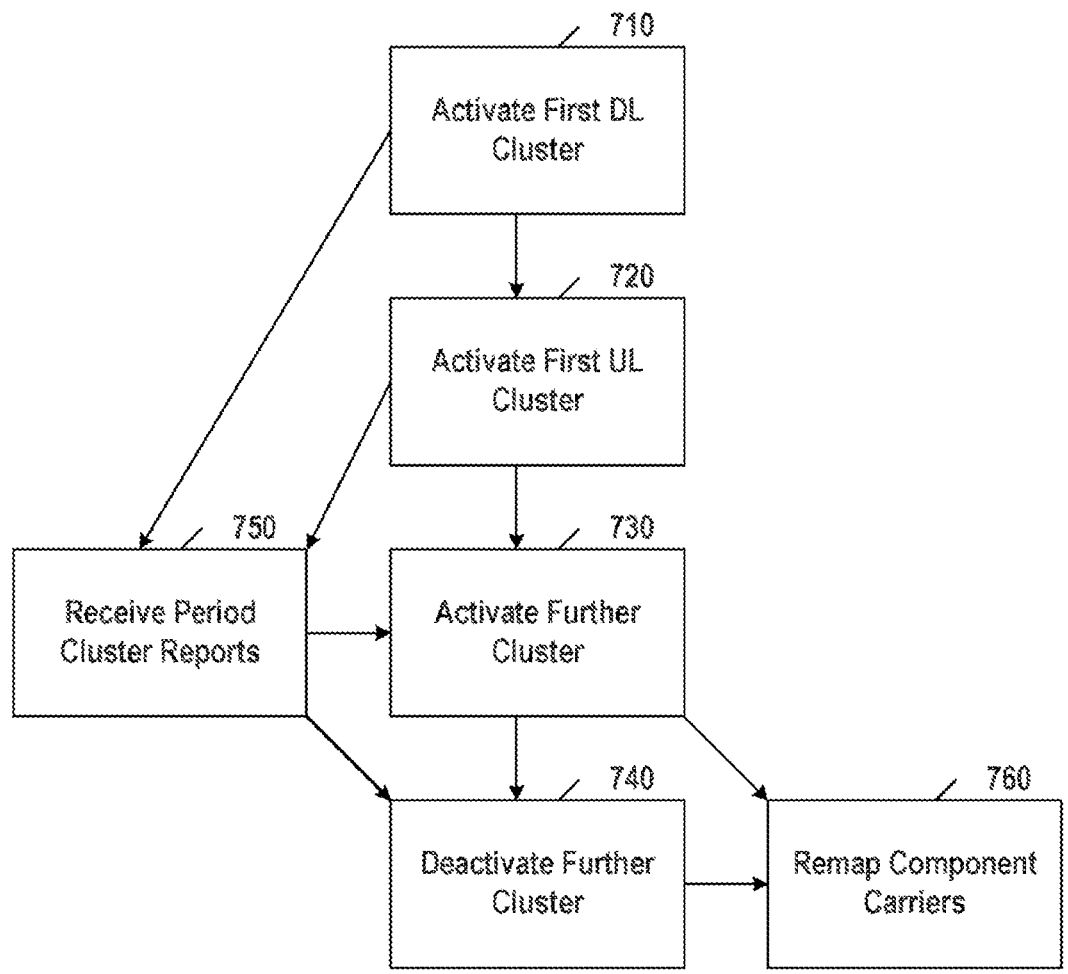
FIG. 7 illustrates a method, according to some embodiments of the present disclosure.

FIG. 7 illustrates a method according to some embodiments of the present disclosure. As shown in FIG. 7, the method can include, at 710, activating a first downlink cluster of a plurality of downlink clusters, each downlink cluster including a downlink cluster processor configured to process three or more downlink data layers. This may correspond to 410 in FIG. 4, described above. The method can also include, at 720, activating a first uplink cluster of a plurality of uplink clusters, each uplink cluster including an uplink cluster processor configured to process three or more uplink data layers. This may correspond to 610 in FIG. 6, described above.

The method can further include, at 730, activating a further cluster, for example, activating at least one more cluster of the plurality of downlink clusters or the plurality of uplink clusters, based on a first scaling condition being met. This may correspond to 415 in FIGS. 4 and 615 in FIG. 6, described above. The scaling condition can be any of the above-described conditions that prompt scaling, such as processor load, throughput, and/or latency, considered individually or in combination. Thus, for example, activating can be according to a processor load, throughput, or latency of active clusters of the plurality of downlink clusters and the plurality of uplink clusters. More particularly, the activating can be based on comparing a current throughput, latency, or processor load to a threshold. The threshold can be pre-set or dynamically determined.

The method can additionally include, at 740, deactivating the further cluster. This may correspond to 417 in FIGS. 4 and 617 in FIG. 6, described above. For example, the method can include deactivating the at least one more cluster of the plurality of downlink clusters or the plurality of uplink clusters, based on a second scaling condition being met. The second scaling condition can be a different threshold or set of thresholds than the first scaling condition. For example, the deactivating can be according to a processor load, throughput, or latency of active clusters of the plurality of downlink clusters and the plurality of uplink clusters. The deactivating can be based on comparing a current throughput, latency, or processor load to a threshold. This may be a different threshold than for activation.

Once each cluster is activated, that method can include, at 750, receiving periodic reports from the plurality of downlink clusters and from the plurality of uplink clusters. The periodic reports may be based on cluster report timers, which may expire on a scheduled basis. Thus, for example, the periodic reports may be received only from active clusters of the plurality of downlink clusters and the plurality of uplink clusters.

Figure 9:
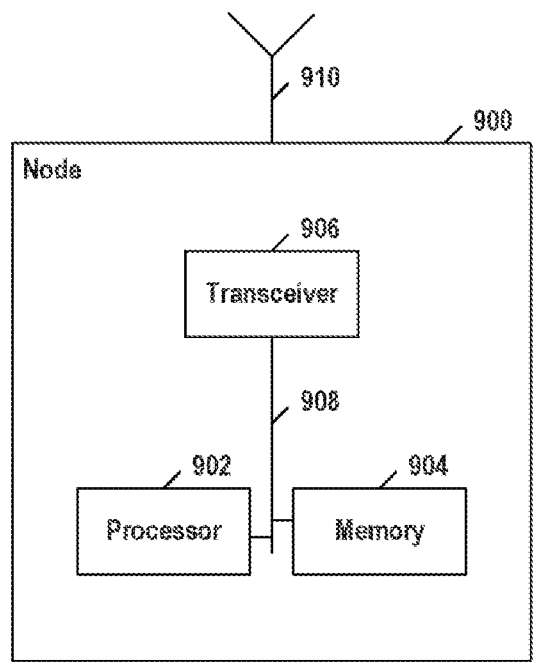
FIG. 9 illustrates an example node, in which some aspects of the present disclosure may be implemented, according to some embodiments of the present disclosure.
Figure 10:
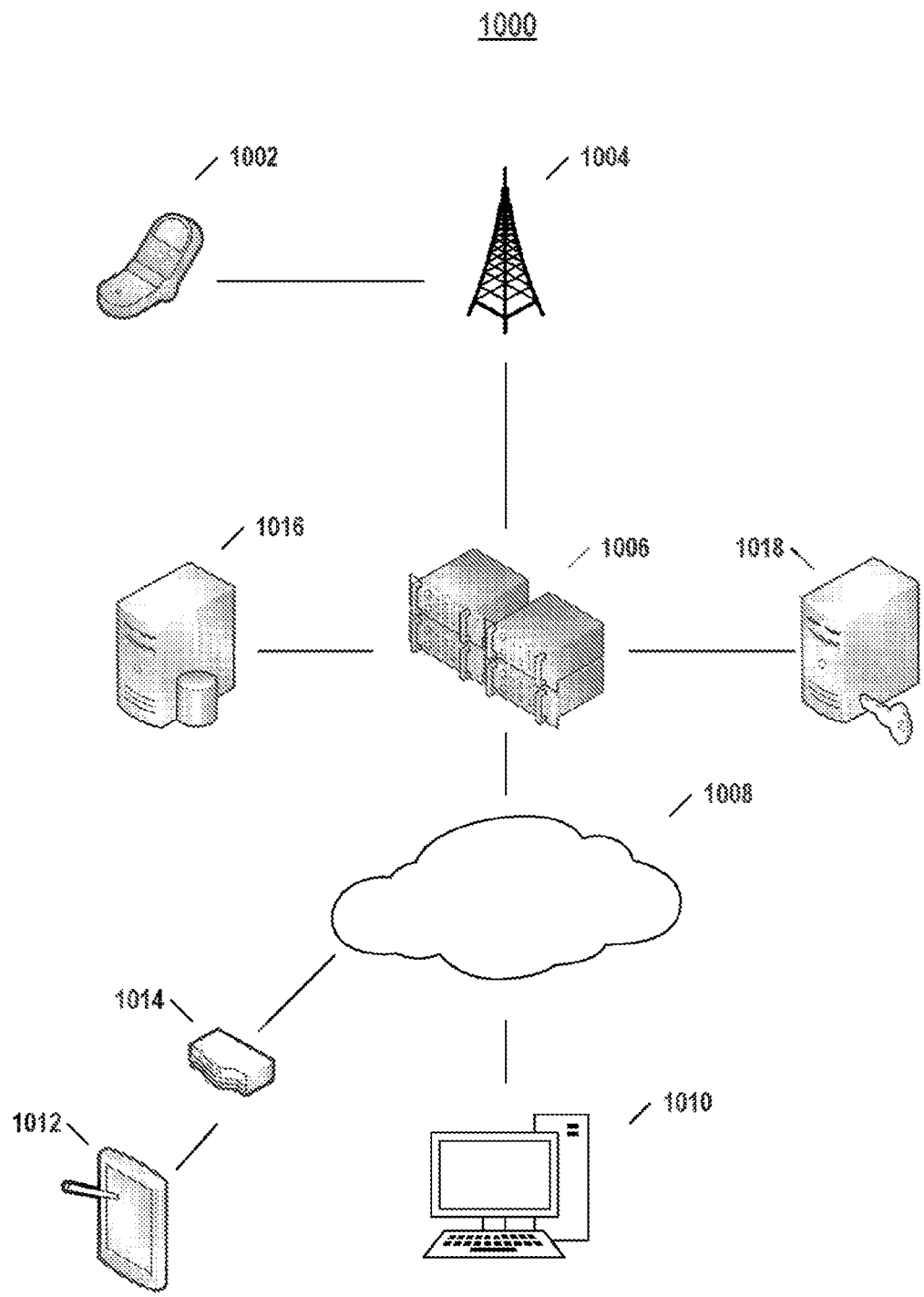
FIG. 10 illustrates an example wireless network, in which some aspects of the present disclosure may be implemented, according to some embodiments of the present disclosure.

The method can also include, at 760, remapping component carriers upon activating or deactivating one or more clusters of the plurality of downlink clusters or the plurality of uplink clusters. This may correspond to 470 in FIGS. 4 and 670 in FIG. 6, described above. For example, when only one cluster is active, all component carriers may be handled by that cluster. When two or more clusters are active, the component carriers may be split amongst the clusters. The software and hardware methods and systems disclosed herein, such as the system of FIG. 2 or the methods illustrated in FIGS. 3 through 7 may be implemented by any suitable nodes in a wireless network. For example, FIGS. 8 and 9 illustrate respective apparatuses 800 and 900, and FIG. 10 illustrates an exemplary wireless network 1000, in which some aspects of the present disclosure may be implemented, according to some embodiments of the present disclosure.

Figure 8:
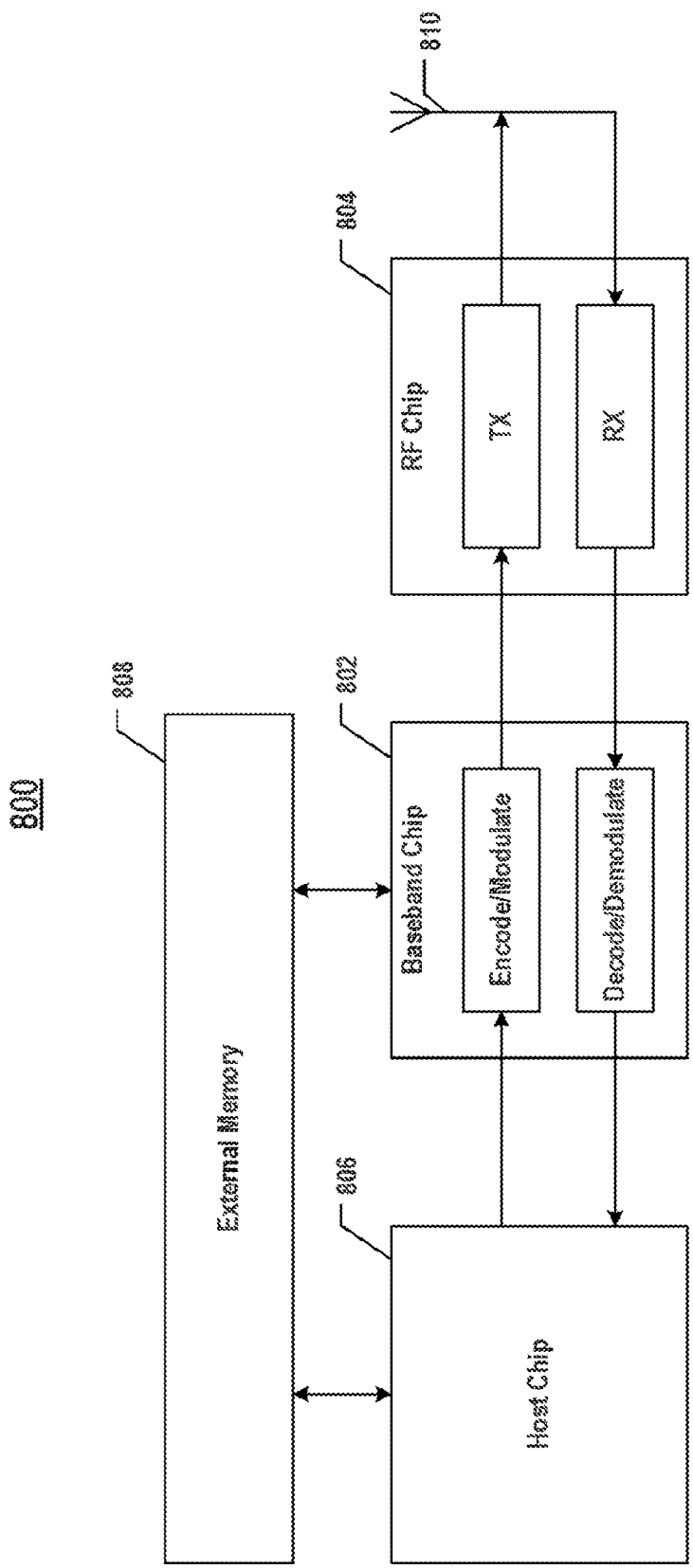
FIG. 8 illustrates a block diagram of an apparatus including a baseband chip, a radio frequency chip, and a host chip, according to some embodiments of the present disclosure.

FIG. 8 illustrates a block diagram of an apparatus 800 including a baseband chip 802, a radio frequency chip 804, and a host chip 806, according to some embodiments of the present disclosure. Apparatus 800 may be an example of any suitable node of wireless network 1000 in FIG. 10, such as user equipment 1002 or network node 1004. As shown in FIG. 8, apparatus 800 may include baseband chip 802, radio frequency chip 804, host chip 806, and one or more antennas 810. In some embodiments, baseband chip 802 is implemented by processor 902 and memory 904, and radio frequency chip 804 is implemented by processor 902, memory 904, and transceiver 906, as described below with respect to FIG. 9. In some embodiments, baseband chip 802 may, in whole or in part, implement the systems and methods and generate and process the messages shown in FIGS. 2-7. For example, baseband chip 802 in a user equipment may perform the UE steps, generate the UE messages, and the like, respectively in the uplink and downlink. Besides the on-chip memory (also known as "internal memory" or "local memory," e.g., registers, buffers, or caches) on each chip 802, 804, or 806, apparatus 800 may further include an external memory 808 (e.g., the system memory or main memory) that can be shared by each chip 802, 804, or 806 through the system/main bus. Although baseband chip 802 is illustrated as a standalone SoC in FIG. 8, it is understood that in one example, baseband chip 802 and radio frequency chip 804 may be integrated as one SoC; in another example, baseband chip 802 and host chip 806 may be integrated as one SoC; in still another example, baseband chip 802, radio frequency chip 804, and host chip 806 may be integrated as one SoC, as described above.

In the uplink, host chip 806 may generate raw data and send it to baseband chip 802 for encoding, modulation, and mapping. As mentioned above, the data from host chip 806 may be associated with various IP flows. Baseband chip 802 may map those IP flows to quality of service flows and perform additional data plane management functions, as described above. Baseband chip 802 may also access the raw data generated by host chip 806 and stored in external memory 808, for example, using the direct memory access (DMA). Baseband chip 802 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 802 may perform any other functions, such as symbol or layer mapping, to convert the raw data into a signal that can be used to modulate the carrier frequency for transmission. In the uplink, baseband chip 802 may send the modulated signal to radio frequency chip 804. Radio frequency chip 804, through the transmitter (Tx), may convert the modulated signal in the digital form into analog signals, i.e., radio frequency signals, and perform any suitable front-end radio frequency functions, such as filtering, up-conversion, or sample-rate conversion. Antenna 810 (e.g., an antenna array) may transmit the radio frequency signals provided by the transmitter of radio frequency chip 804.

In the downlink, antenna 810 may receive radio frequency signals and pass the radio frequency signals to the receiver (Rx) of radio frequency chip 804. Radio frequency chip 804 may perform any suitable front-end radio frequency functions, such as filtering, down-conversion, or sample-rate conversion, and convert the radio frequency signals into low-frequency digital signals (baseband signals) that can be processed by baseband chip 802. In the downlink, baseband chip 802 may demodulate and decode the baseband signals to extract raw data that can be processed by host chip 806. Baseband chip 802 may perform additional functions, such as error checking, de-mapping, channel estimation, descrambling, etc. The raw data provided by baseband chip 802 may be sent to host chip 806 directly or stored in external memory 808.

As shown in FIG. 9, a node 900 may include a processor 902, a memory 904, a transceiver 906. These components are shown as connected to one another by bus 908, but other connection types are also permitted. When node 900 is user equipment 1002, additional components may also be included, such as a user interface (UI), sensors, and the like. Similarly, node 900 may be implemented as a blade in a server system when node 900 is configured as core network element 1006. Other implementations are also possible.

Transceiver 906 may include any suitable device for sending and/or receiving data. Node 900 may include one or more transceivers, although only one transceiver 906 is shown for simplicity of illustration. An antenna 910 is shown as a possible communication mechanism for node 900. Multiple antennas and/or arrays of antennas may be utilized. Additionally, examples of node 900 may communicate using wired techniques rather than (or in addition to) wireless techniques. For example, network node 1004 may communicate wirelessly to user equipment 1002 and may communicate by a wired connection (for example, by optical or coaxial cable) to core network element 1006. Other communication hardware, such as a network interface card (NIC), may be included as well.

As shown in FIG. 9, node 900 may include processor 902. Although only one processor is shown, it is understood that multiple processors can be included. Processor 902 may include microprocessors, microcontrollers, digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 902 may be a hardware device having one or many processing cores. Processor 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software. Processor 902 may be a baseband chip, such as baseband chip 802 in FIG. 8. Node 900 may also include other processors, not shown, such as a central processing unit of the device, a graphics processor, or the like. Processor 902 may include internal memory (also known as local memory, not shown in FIG. 9) that may serve as memory for L2 data. Processor 902 may include a radio frequency chip, for example, integrated into a baseband chip, or a radio frequency chip may be provided separately. Processor 902 may be configured to operate as a modem of node 900, or may be one element or component of a modem. Other arrangements and configurations are also permitted.

As shown in FIG. 9, node 900 may also include memory 904. Although only one memory is shown, it is understood that multiple memories can be included. Memory 904 can broadly include both memory and storage. For example, memory 904 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 902. Broadly, memory 904 may be embodied by any computer-readable medium, such as a non-transitory computer-readable medium. The memory 904 can be the external memory 808 in FIG. 8. The memory 904 may be shared by processor 902 and other components of node 900, such as the unillustrated graphic processor or central processing unit.

As shown in FIG. 10, wireless network 1000 may include a network of nodes, such as a UE 1002, a network node 1004, and a core network element 1006. User equipment 1002 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 1002 is illustrated as a mobile phone simply by way of illustration and not by way of limitation.

Network node 1004 may be a device that communicates with user equipment 1002, such as a wireless access point, a base station (BS), a Node B, an enhanced Node B (eNodeB or eNB), a next-generation NodeB (gNodeB or gNB), a cluster master node, or the like. Network node 1004 may have a wired connection to user equipment 1002, a wireless connection to user equipment 1002, or any combination thereof. Network node 1004 may be connected to user equipment 1002 by multiple connections, and user equipment 1002 may be connected to other access nodes in addition to network node 1004. Network node 1004 may also be connected to other UEs. It is understood that network node 1004 is illustrated by a radio tower by way of illustration and not by way of limitation.

Core network element 1006 may serve network node 1004 and user equipment 1002 to provide core network services. Examples of core network element 1006 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 1006 includes an access and mobility management function (AMF) device, a session management function (SMF) device, or a user plane function (UPF) device, of a core network for the NR system. It is understood that core network element 1006 is shown as a set of rack-mounted servers by way of illustration and not by way of limitation.

Core network element 1006 may connect with a large network, such as the Internet 1008, or another IP network, to communicate packet data over any distance. In this way, data from user equipment 1002 may be communicated to other UEs connected to other access points, including, for example, a computer 1010 connected to Internet 1008, for example, using a wired connection or a wireless connection, or to a tablet 1012 wirelessly connected to Internet 1008 via a router 1014. Thus, computer 1010 and tablet 1012 provide additional examples of possible UEs, and router 1014 provides an example of another possible access node.

A generic example of a rack-mounted server is provided as an illustration of core network element 1006. However, there may be multiple elements in the core network including database servers, such as a database 1016, and security and authentication servers, such as an authentication server 1018. Database 1016 may, for example, manage data related to user subscription to network services. A home location register (HLR) is an example of a standardized database of subscriber information for a cellular network. Likewise, authentication server 1018 may handle authentication of users, sessions, and so on. In the NR system, an authentication server function (AUSF) device may be the specific entity to perform user equipment authentication. In some embodiments, a single server rack may handle multiple such functions, such that the connections between core network element 1006, authentication server 1018, and database 1016, may be local connections within a single rack.

Each of the elements of FIG. 10 may be considered a node of wireless network 1000. More detail regarding the possible implementation of a node is provided by way of example in the description of a node 900 in FIG. 9 above. Node 900 may be configured as user equipment 1002, network node 1004, or core network element 1006 in FIG. 10. Similarly, node 900 may also be configured as computer 1010, router 1014, tablet 1012, database 1016, or authentication server 1018 in FIG. 10.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 900 in FIG. 9. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital versatile disk (DVD), and floppy disk where disks usually reproduce data magnetically, while discs reproduce data optically with lasers. Combinations of the above should also be included within the scope of computer-readable media.

According to one aspect of the present disclosure, an apparatus for communication both uplink and downlink can include a plurality of downlink clusters, each downlink cluster including a downlink cluster processor configured to process three or more downlink data layers. The apparatus can also include a plurality of uplink clusters, each uplink cluster including an uplink cluster processor configured to process three or more uplink data layers. The apparatus can further include a controller configured to scale the plurality of downlink clusters and configured to scale the plurality of uplink clusters. Scaling the plurality of downlink clusters and the plurality of uplink clusters can include activating or deactivating one or more clusters of the plurality of downlink clusters, the plurality of uplink clusters, or both the plurality of downlink clusters and the plurality of uplink clusters.

In some embodiments, the three or more downlink data layers can include layer two, layer three, and layer four data layers.

In some embodiments, the three or more uplink data layers can include layer two, layer three, and layer four data layers.

In some embodiments, the downlink cluster processor can be mapped to a set of component carriers at a medium access control (MAC) layer and to logical channels from layer two upwards.

In some embodiments, the uplink cluster processor can be mapped to a set of component carriers according to a same subcarrier spacing range.

In some embodiments, the controller can be configured to scale according to a processor load, throughput, or latency of active clusters of the plurality of downlink clusters and the plurality of uplink clusters.

In some embodiments, the scaling can include comparing a current throughput, latency, or processor load to a threshold.

In some embodiments, the controller can be configured to receive periodic reports from the plurality of downlink clusters and from the plurality of uplink clusters.

In some embodiments, the periodic reports can be received only from active clusters of the plurality of downlink clusters and the plurality of uplink clusters.

In some embodiments, the controller can be configured to remap component carriers upon activating or deactivating one or more clusters of the plurality of downlink clusters or the plurality of uplink clusters.

According to another aspect of the present disclosure, a method for cluster management can include activating a first downlink cluster of a plurality of downlink clusters, each downlink cluster including a downlink cluster processor configured to process three or more downlink data layers. The method can also include activating a first uplink cluster of a plurality of uplink clusters, each uplink cluster including an uplink cluster processor configured to process three or more uplink data layers. The method can further include activating at least one more cluster of the plurality of downlink clusters or the plurality of uplink clusters, based on a first scaling condition being met.

In some embodiments, the activating can be according to a processor load, throughput, or latency of active clusters of the plurality of downlink clusters and the plurality of uplink clusters.

In some embodiments, the activating can be based on comparing a current throughput, latency, or processor load to a threshold.

In some embodiments, the method can further include deactivating the at least one more cluster of the plurality of downlink clusters or the plurality of uplink clusters, based on a second scaling condition being met.

In some embodiments, the deactivating can be according to a processor load, throughput, or latency of active clusters of the plurality of downlink clusters and the plurality of uplink clusters.

In some embodiments, the deactivating can be based on comparing a current throughput, latency, or processor load to a threshold.

In some embodiments, the method can further include receiving periodic reports from the plurality of downlink clusters and from the plurality of uplink clusters.

In some embodiments, the periodic reports may be received only from active clusters of the plurality of downlink clusters and the plurality of uplink clusters.

In some embodiments, the method can additionally include remapping component carriers upon activating or deactivating one or more clusters of the plurality of downlink clusters or the plurality of uplink clusters.

According to a further aspect of the present disclosure, a non-transitory computer-readable medium can be encoded with instructions that, when executed in hardware, perform a process for cluster management. The process can include activating a first downlink cluster of a plurality of downlink clusters, each downlink cluster including a downlink cluster processor configured to process three or more downlink data layers. The process can also include activating a first uplink cluster of a plurality of uplink clusters, each uplink cluster including an uplink cluster processor configured to process three or more uplink data layers. The process can further include activating at least one more cluster of the plurality of downlink clusters or the plurality of uplink clusters, based on a first scaling condition being met.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for communication both uplink and downlink, the apparatus comprising:
   a plurality of downlink clusters, each downlink cluster comprising a downlink cluster processor configured to process three or more downlink data layers;
   a plurality of uplink clusters, each uplink cluster comprising an uplink cluster processor configured to process three or more uplink data layers; and
   a controller configured to scale the plurality of downlink clusters and configured to scale the plurality of uplink clusters, wherein scaling the plurality of downlink clusters and the plurality of uplink clusters comprises activating or deactivating one or more cluster of the plurality of downlink clusters, the plurality of uplink clusters, or both the plurality of downlink clusters and the plurality of uplink clusters.

2. The apparatus of claim 1, wherein the three or more downlink data layers comprise layer two, layer three, and layer four data layers.

3. The apparatus of claim 1, wherein the three or more uplink data layers comprise layer two, layer three, and layer four data layers.

4. The apparatus of claim 1, wherein the downlink cluster processor is mapped to a set of component carriers at a medium access control (MAC) layer and to logical channels from layer two upwards.

5. The apparatus of claim 1, wherein the uplink cluster processor is mapped to a set of component carriers according to a same subcarrier spacing range.

6. The apparatus of claim 1, wherein the controller is configured to scale according to a processor load, throughput, or latency of active clusters of the plurality of downlink clusters and the plurality of uplink clusters.

7. The apparatus of claim 6, wherein the scaling comprises comparing a current throughput, latency, or processor load to a threshold.

8. The apparatus of claim 1, wherein the controller is configured to receive periodic reports from the plurality of downlink clusters and from the plurality of uplink clusters.

9. The apparatus of claim 8, wherein the periodic reports are received only from active clusters of the plurality of downlink clusters and the plurality of uplink clusters.

10. The apparatus of claim 1, wherein the controller is configured to remap component carriers upon activating or deactivating one or more clusters of the plurality of downlink clusters or the plurality of uplink clusters.

11. A method for cluster management, the method comprising:
    activating a first downlink cluster of a plurality of downlink clusters, each downlink cluster comprising a downlink cluster processor configured to process three or more downlink data layers;
    activating a first uplink cluster of a plurality of uplink clusters, each uplink cluster comprising an uplink cluster processor configured to process three or more uplink data layers; and
    activating at least one more cluster of the plurality of downlink clusters or the plurality of uplink clusters, based on a first scaling condition being met.

12. The method of claim 11, the activating is according to a processor load, throughput, or latency of active clusters of the plurality of downlink clusters and the plurality of uplink clusters.

13. The method of claim 11, wherein the activating is based on comparing a current throughput, latency, or processor load to a threshold.

14. The method of claim 11, further comprising:
    deactivating the at least one more cluster of the plurality of downlink clusters or the plurality of uplink clusters, based on a second scaling condition being met.

15. The method of claim 14, the deactivating is according to a processor load, throughput, or latency of active clusters of the plurality of downlink clusters and the plurality of uplink clusters.

16. The method of claim 14, wherein the deactivating is based on comparing a current throughput, latency, or processor load to a threshold.

17. The method of claim 11, further comprising:
    receiving periodic reports from the plurality of downlink clusters and from the plurality of uplink clusters.

18. The method of claim 17, wherein the periodic reports are received only from active clusters of the plurality of downlink clusters and the plurality of uplink clusters.

19. The method of claim 11, further comprising:
    remapping component carriers upon activating or deactivating one or more clusters of the plurality of downlink clusters or the plurality of uplink clusters.

20. A non-transitory computer-readable medium encoded with instructions that, when executed in hardware, perform a process for cluster management, the process comprising:
    activating a first downlink cluster of a plurality of downlink clusters, each downlink cluster comprising a downlink cluster processor configured to process three or more downlink data layers;
    activating a first uplink cluster of a plurality of uplink clusters, each uplink cluster comprising an uplink cluster processor configured to process three or more uplink data layers; and
    activating at least one more cluster of the plurality of downlink clusters or the plurality of uplink clusters, based on a first scaling condition being met.

* * * * *